No. 725,091. PATENTED APR. 14, 1903.
J. F. KELLY & C. C. CHESNEY.
ALTERNATING CURRENT APPARATUS.
APPLICATION FILED JULY 28, 1900.
NO MODEL. 2 SHEETS—SHEET 1.
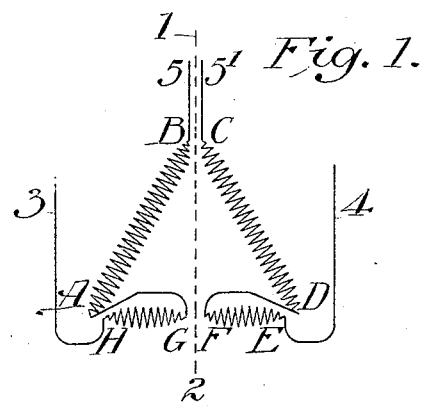
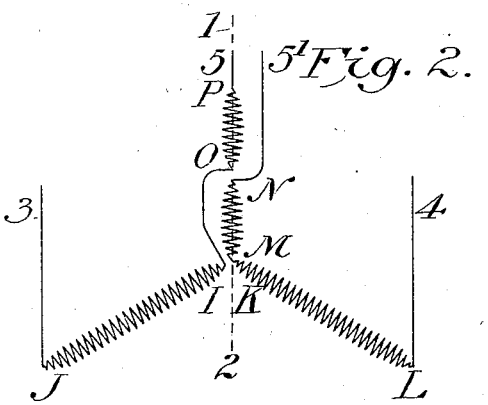
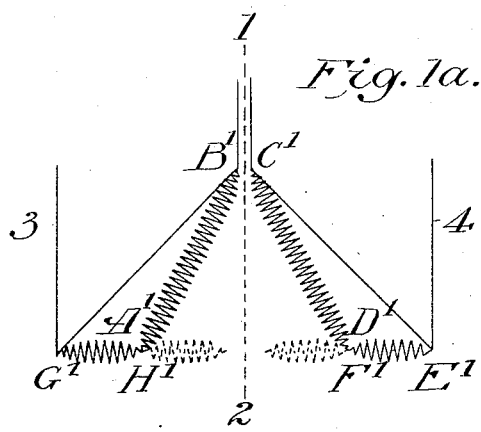
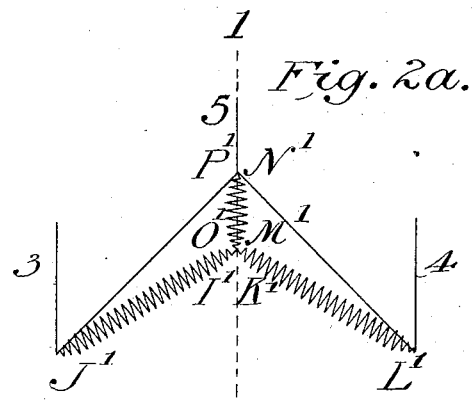
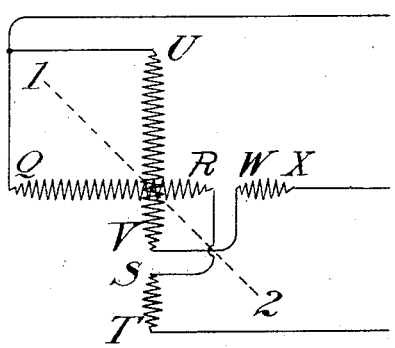
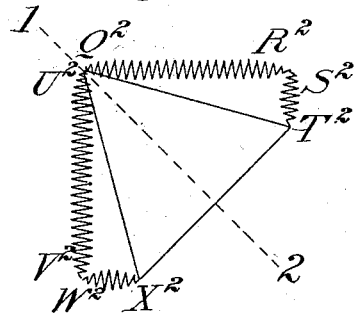
WITNESSES:
G. T. Hackley.
L. Vreeland.
INVENTORS
John F. Kelly,
Cummings C. Chesney.
BY
ATTORNEY

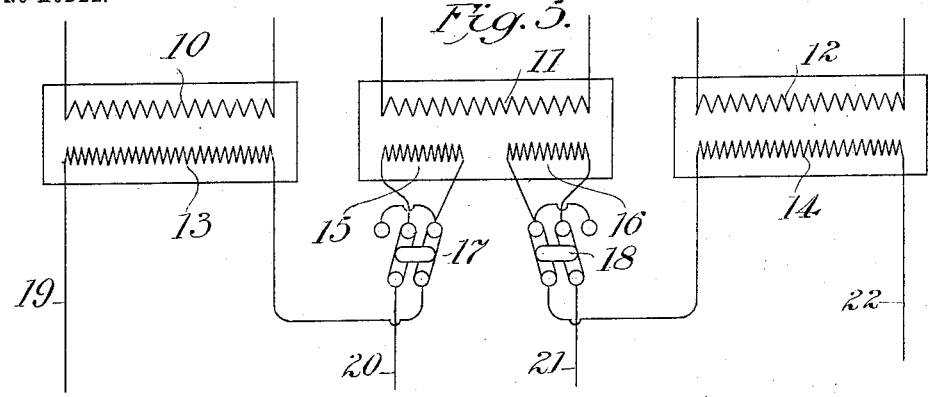
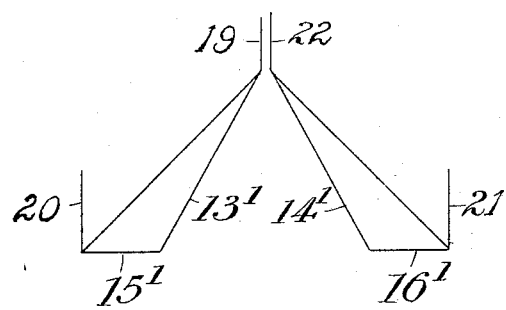
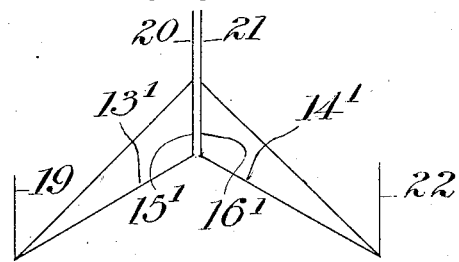
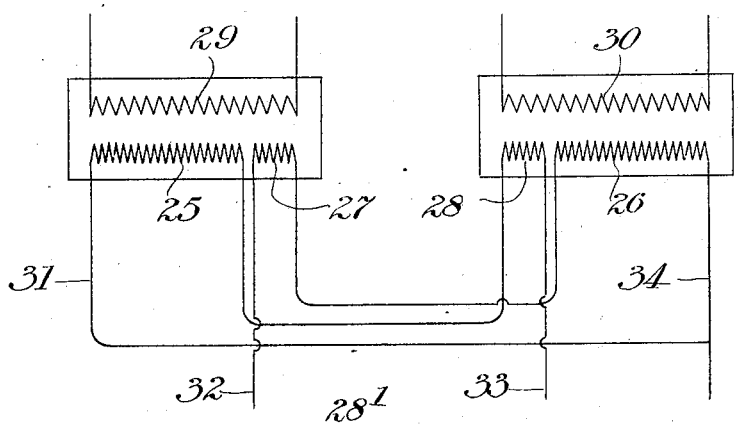

UNITED STATES PATENT OFFICE.

JOHN F. KELLY AND CUMMINGS C. CHESNEY, OF PITTSFIELD, MASSACHUSETTS, ASSIGNORS TO STANLEY ELECTRIC MANUFACTURING COMPANY, OF PITTSFIELD, MASSACHUSETTS, A CORPORATION OF NEW JERSEY.

ALTERNATING-CURRENT APPARATUS.

SPECIFICATION forming part of Letters Patent No. 725,091, dated April 14, 1903.

Application filed July 28, 1900. Serial No. 25,102. (No model.)

*To all whom it may concern:*

Be it known that we, JOHN F. KELLY and CUMMINGS C. CHESNEY, citizens of the United States, residing at Pittsfield, Berkshire county, and State of Massachusetts, have invented certain new and useful Improvements in Alternating-Current Apparatus, of which the following is a full, clear, and exact description.

Our invention relates to improvements in alternating-current apparatus, and has for its object the production of alternating currents of definite phase displacements from electromotive forces of different phase displacements by the use of main and auxiliary generating-circuits. It is applicable to and we shall describe it in connection with both alternators and secondary generators or transformers.

By our invention any generator-circuits, such as those of a three-phase generator or the three secondaries of three transformers supplied by three-phase currents, can be combined to produce two currents of ninety degrees phase difference, or the circuits of a two-phase generator or the two secondaries of two transformers supplied with two-phase currents can be combined to produce three-phase currents. The same fundamental invention is involved in producing both these results, as will be further pointed out in connection with the following description of the invention, reference being had to the accompanying drawings, in which—

Figure 1 represents diagrammatically our invention embodied in a generator capable of having a delta-connected winding applied thereto. Fig. 2 represents diagrammatically our invention embodied in a generator constructed so as to be capable of having a star-connected winding applied thereto. Figs. 1ª and 2ª are diagrams showing resultant electromotive forces of the same. Fig. 3 represents diagrammatically our invention embodied in generators capable of having two-phase windings applied thereto. Fig. 4 is a diagram showing resultant electromotive forces obtained from the generators of Fig. 3. Fig. 5 represents an embodiment of our invention employing three secondary generators or transformers supplied with three-phase currents of one hundred and twenty degrees displacement or difference in phase and connections, whereby the secondary electromotive forces may be combined to produce two-phase currents. Figs. 5ª and 5ᵇ are diagrams showing the original and resultant electromotive forces of Fig. 5 under differing conditions. Fig. 6 represents an embodiment of our invention employing two transformers supplied with two-phase currents and connections such as to produce three-phase currents. Fig. 6ª is a diagram of electromotive forces of Fig. 6.

Referring more particularly to the drawings, A B and C D represent two armature-circuits situated with relation to one another, the same as two adjoining circuits of any delta-wound generator. E F and G H may be regarded as two parts of the third circuit of the delta-wound generator. It is to be noted that all these parts are symmetrical relatively to a vertical line 1 2. The electromotive forces in the circuits A B C D and the two-part circuit E F G H are all displaced from one another by one hundred and twenty degrees. Now we have discovered that we can by applying to A B a reversed portion G H of the third circuit and to C D an equal reversed portion thereof E F, so as to combine the electromotive forces of A B with those of G H reversed, and the electromotive forces of C D with those of E F reversed, we can produce resultant electromotive forces which shall be displaced by ninety degrees and produce an efficient machine for the generation of two-phase currents. In order to produce this result, we make the auxiliary generating-circuits G H and E F each equal to .366 of one of the main generator-circuits A B and C D and connect the inner end of G H and the inner end of E F to the ends of the main generator-circuits A B and C D, respectively, as shown, and the outer ends of G H and E F to the line conductors 3 4. The two circuits A B and C D are either connected to their respective line conductors 5 5' or joined together so as to have the common return ordinarily used in two-phase systems.

Fig. 1ª shows the electromotive forces diagrammatically, A' B' and C' D' being the main generator-circuits and E' F' and G' H' the auxiliary generator-circuits and their respective electromotive forces. When connected as above described, the electromotive forces will be as here indicated, and the resultant electromotive forces will be B' G' and C' E', which are dispaced by ninety degrees and symmetrical relatively to 1 2 and will produce two-phase currents when the circuits are completed.

When the plan of the generator is that of the normally star-connected generator, Fig. 2, I J and K L constitute the main generator-circuits, and the auxiliary generator-circuits are made up of M N and O P, all symmetrical with reference to the medial line 1 2. If now M N and O P are each made to be .366 of the main generator-circuits I J and K L and connected thereto, so that one of the inner ends of the auxiliary generator-circuits is connected to one of the inner ends of the main generator-circuits, as shown, the electromotive forces of I J and O P and those of K L and M N will combine so as to produce resultants also symmetrical and displaced from each other by ninety degrees. It is to be noted that since the auxiliary electromotive forces are of the same phase and value and direction the two auxiliary generator-coils M N and O P may be combined into one and connected to the inner ends of both I J and K L, in which case, however, the single auxiliary should be made of greater conductivity. This arrangement is shown in Fig. 2ᵃ, which also shows diagrammatically the electromotive forces of the various circuits and the resultants. I' J' and K' L' represent the main generator-circuits and M' N' O' P' the auxiliary generator circuit or circuits. L' N' and J' P' represent the resultant electromotive forces displaced symmetrically from the main electromotive forces and having a phase difference of ninety degrees.

Fig. 3 represents generating-circuits having electromotive forces displaced by ninety degrees from each other, as in my two-phase generator. Q R and U V are the main generator-circuits and S T and W X the auxiliary generator-circuits, all symmetrically disposed relatively to the line 1 2. By making the auxiliary generator-circuits two hundred and fifty-eight one-thousandths of the main generator-circuits and connecting the outer ends of the main generator-circuits to one main and the inner ends thereof to the inner ends of the auxiliary generating-coils S T and W X, having electromotive forces of different phase, symmetrical resultant electromotive forces are produced displaced in phase by one hundred and twenty degrees, which supply currents of one hundred and twenty degrees displacement to the line conductors.

Fig. 4 shows diagrammatically the main and auxiliary electromotive forces when so connected, $Q^2 T^2 Q^2 X^2 T^2 X^2$ being the symmetrical resultant electromotive forces.

Fig. 5 shows our invention as applied to transformers supplied with three-phase currents. In this case, 10, 11, and 12 represent, respectively, the primaries of three transformers and 13 and 14 the secondaries of two of the same, constituting main generator-circuits, 15 and 16 being the secondary of the third, which is divided into two auxiliary generator-circuits each equal to three hundred and sixty-six one-thousandths of either of the main coils 13 14. 17 and 18 are two reversing-switches, and 19, 20, 21, and 22 are the terminals of four line conductors. When the reversing-switches are as shown, the three currents of one hundred and twenty degrees displacement are fed into the primaries delta-connected, two currents of ninety degrees displacement will be set up circuits 19, 20, 21, and 22. If one of the reversing-switches is thrown to the other contact, so as to reverse the connections of one of the auxiliary generator-circuits, currents of ninety degrees displacement will be set up in the line conductors when the primary currents are displaced by one hundred and twenty degrees and the circuits are star-connected.

Figs. 5ᵃ and 5ᵇ represent diagrammatically the original and resultant electromotive forces of the described combination of coils in Fig. 5, the electromotive forces of the coils 13, 14, 15, and 16 being represented by the lines 13', 14', 15', and 16'.

Fig. 6 represents two transformers fed by two-phase currents, 25 and 26 being main generator-coils and 27 28 being auxiliary generator-coils equal to two hundred and fifty-eight one-thousandths of the main coils. If the primaries 29 and 30 are supplied with two-phase currents, the electromotive forces of the main and auxiliary generator-coils with the connections as shown will produce resultant electromotive forces which will cause currents of one hundred and twenty degrees displacement to flow through the line conductors 31 32 33 34.

Fig. 6ᵃ represents diagrammatically the original and resultant electromotive forces of the coils of Fig. 6, the electromotive forces of the coils 25, 26, 27, and 28 being represented, respectively, by the lines 25', 26', 27', and 28'. In Fig. 6 the conductors 31 and 34 are joined together by a connection corresponding to the connection diagrammatically shown in Fig. 6ᵃ.

In all instances it is assumed that the windings are uniform as to direction. Changes in the direction of the winding might necessitate changes in circuit connections. Such changes would, however, be well understood by those skilled in the art, and our invention is not limited to the precise arrangements which we have shown and described.

It is to be noted that the resultant electromotive forces in every case are displaced by fifteen degrees from the electromotive forces of the main generator-circuits.

What we claim is—

1. The combination with two symmetrical generator-circuits having electromotive forces of different phase of similar means connected to said symmetrical generator-coils for producing resultant electromotive forces each displaced in opposite directions by an angle of fifteen degrees from the electromotive forces of said generator-circuits.

2. The combination with two symmetrical principal generator-circuits having electromotive forces of different phase of two auxiliary generator-circuits also symmetrically arranged, each of said auxiliary generator-circuits being connected to a principal generator-circuit having electromotive forces of different phase from its own electromotive forces and to a main.

3. The combination of two symmetrical principal generator-circuits having electromotive forces of different phase, means connected to said principal generator-circuits for supplying symmetrical electromotive forces of lesser value than those of either of said circuits and differing in phase therefrom, said means and principal generator-coils being connected to the mains and supplying electric energy thereto.

4. The combination of two symmetrical principal generator-circuits having electromotive forces of different phase, of two auxiliary generator-circuits having electromotive forces displaced in phase, from those of either of said principal generator-circuits, said auxiliary generator-coils being symmetrically connected to said principal generator-coils and mains connected to said auxiliary and principal generator-circuits.

5. The combination of two symmetrical principal generator-circuits having electromotive forces of different phase of two auxiliary generator-circuits having lesser electromotive forces displaced in phase relatively to the electromotive forces of the principal generator-circuits, but not as to each other, said auxiliary generator-coils being symmetrically connected to said principal generator-coils and to the mains.

6. The combination of two principal generating-circuits symmetrically arranged, having main electromotive forces displaced by a multiple of sixty degrees of means for supplying auxiliary electromotive forces displaced from said main electromotive forces by a multiple of sixty degrees connected to said main circuits producing symmetrical resultant electromotive forces displaced from each other by ninety degrees and connections at the free ends of the sources of said main and auxiliary electromotive forces and the mains.

Signed at Pittsfield this 25th day of July, 1900.

JOHN F. KELLY.
CUMMINGS C. CHESNEY.

Witnesses:
M. L. NICHOLS,
CHARLES E. DORR.